UNITED STATES PATENT OFFICE.

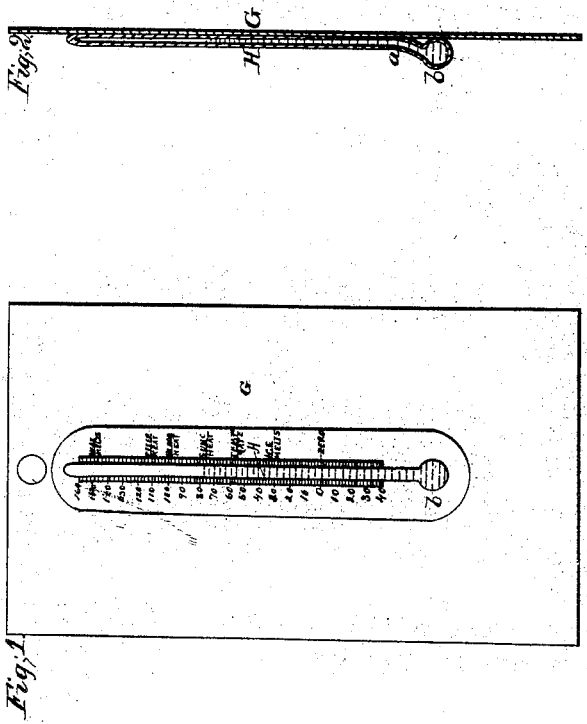
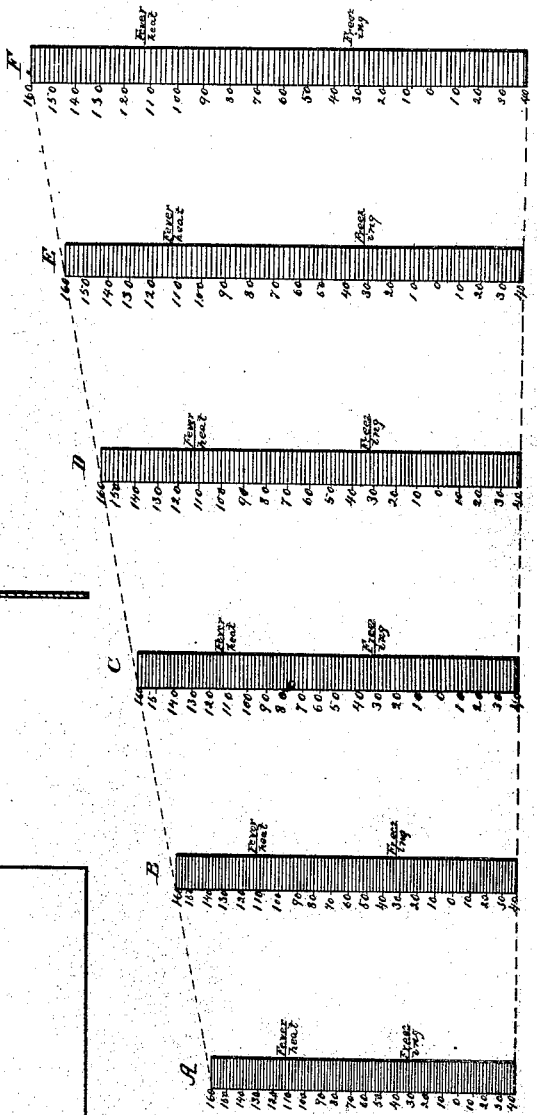

MICHAEL A. FINNELL, OF NEW YORK, N. Y.

IMPROVEMENT IN THERMOMETERS.

Specification forming part of Letters Patent No. 33,935, dated December 17, 1861.

*To all whom it may concern:*

Be it known that I, MICHAEL A. FINNELL, of 132 West Houston street, in the city, county, and State of New York, have invented certain new and useful Improvements in Thermometers; and I do hereby declare that the following is a full, clear, and exact description of the same, reference being had to the accompanying drawings, forming part of this specification, in which—

Figure 1 is a face view of a thermometer constructed according to my invention; Fig. 2, a central vertical section of the same; and Figs. A, B, C, D, E, and F represent a gradational series of scales.

The object of these improvements is to manufacture thermometers at a very greatly reduced cost. The first improvement relates to the scales. To explain its nature, I will first state that, owing to the practical impossibility of making the glass tubes and their bulbs exactly of a definite or given size, there will be a considerable variation in the range of expansion of the mercury in a number of tubes intended to be as nearly as possible of the same size. The scales have been heretofore most commonly constructed by engraving the degrees, figures, letters, &c., by hand upon metal plates, and each scale has been divided to suit the particular tube to which it is applied by first ascertaining the range of expansion of the mercury or spirit in the tube between two given points of temperature and marking upon the tube the limits of such range, next placing the tube on the scale and marking thereon the two degrees to correspond with the marks on the tube, then dividing the scale between those points into the requisite number of parts to represent the intermediate degrees and dividing the remainder of the scale to correspond and afterward engraving it, stamping the letters and figures, waxing and silvering it. This process takes six-sevenths ($\frac{6}{7}$) of the whole time occupied in the manufacture of the thermometer, and when completed the degrees are seldom accurate. Instead of using this process of construction, I provide a series of gradational scales printed upon paper or other suitable material, and after having ascertained and marked upon a tube the range of the expansion of the mercury or spirit within it between two suitable points of temperature I select from my scales one whose graduation corresponds in those points with the marks on the tube and attach the tube to the scale. As the scale is equally divided into degrees, its graduation, being correct at the two points first marked on the tube, will be correct throughout.

The drawings represent a series of six printed scales, which is a sufficient number to illustrate my invention, though I propose to use a much larger number—say twenty-five—the second scale B being longer than A by one-fortieth ($\frac{1}{40}$) part of A; the third C, longer than B by one-fortieth ($\frac{1}{40}$) part of B; the fourth D, longer than C by one-fortieth ($\frac{1}{40}$) part of C, and so on throughout the series, dividing the several scales into the same number of equal parts and numbering the degrees in the same manner in every one—as, for instance, dividing each into one hundred equal parts, representing two hundred degrees, and numbering it from 40° below to 160° above zero. The above-mentioned number of divisions, with a progressive increase of one-fortieth ($\frac{1}{40}$) in the length of the scales, gives an increase from scale to scale equal to 5°, and hence, as $\frac{200}{5}=40$, there will be an increase of only 1° in every 40°, and consequently by fitting a glass to the scale which nearest approximates to the two marks indicating the range of expansion of the mercury or spirit within it a correct indication of temperature is obtained. The division of the engraved plates or blocks from which the scales are printed may be obtained by means of a dividing-engine, and by that means much greater correctness of indication throughout the whole range of expansion may be obtained than is done with the metal scales divided and cut by hand, which are necessarily liable to inaccuracies.

In order to reduce the cost as much as possible, I propose to print the scale on a stout card or piece of card-board or pasteboard or bristol-board, which may also constitute the case or back of the thermometer, as shown in Figs. 1 and 2, in which G is the card and H the tube. This card may be ornamented tastefully at little expense by lithographic or other printing, by which process the scale may be produced at the same time. In order to enable the tube to lie close against the plane surface of the so-constructed scale or against any flat scale or plane surface and be attached closely thereto without cutting or providing a hole in the said scale or surface for the reception of the bulb, my second improvement consists in bending the tube close to or near the bulb to throw the bulb forward to a sufficient distance, as illustrated in the section, Fig. 2, in which the bend $a$ is represented just above the bulb $b$, which, with nearly the whole length of the tube, is shown to lie close against the card.

My third improvement consists in affixing the tube to its scale by means of a suitable adhesive substance, thereby dispensing with the loops, wiring, or other means of attachment heretofore adopted and producing a much neater appearance. Various materials might be used for this purpose; but that which I prefer is what is known and sold in most places in the United States as "Spalding's Prepared Glue."

Thermometers having their scales printed upon paper may be made so light and convenient that they may be inserted without difficulty in walking-canes, hats, umbrellas, watches, clocks, breast-pins, looking-glasses, picture-frames, daguerreotype-cases, business show-cards, sewing-machines, ladies' work-boxes, &c. For business-cards the scales may be printed upon the cards themselves. Thermometers having the cases made of a piece of card, as shown in Figs. 1 and 2, and having the tube attached by adhesive material, are so light that they may be dropped on a floor or thrown to considerable distance without injury.

What I claim as my invention is—

1. The employment of card, bristol, or paste board as the material for printed thermometer-scales, as and for the purposes set forth.

2. Securing the tube to such scale by cementation, as set forth.

3. In combination with tubes thus secured, the bend near the bulb, as set forth.

4. In combination with said printed thermometer-scales, the above-described method of adapting the thermometer-tubes to their appropriate ranges of indication.

M. A. FINNELL.

Witnesses:
RICHARDSON GAWLEY,
JAMES LAIRD.